Nov. 5, 1946.  M. WARE  2,410,556

DRIVE MECHANISM

Filed Dec. 5, 1942  3 Sheets-Sheet 1

INVENTOR.
Marsden Ware
BY Tibbetts & Hart
Attorneys

Nov. 5, 1946.    M. WARE    2,410,556
DRIVE MECHANISM
Filed Dec. 5, 1942    3 Sheets-Sheet 2

Inventor
Marsden Ware
By Tibbetts & Hart
Attorneys

Patented Nov. 5, 1946

2,410,556

UNITED STATES PATENT OFFICE 2,410,556

DRIVE MECHANISM

Marsden Ware, Huntington Woods, Mich., assignor to Packard Motor Car Company, Detroit, Mich., a corporation of Michigan Application December 5, 1942, Serial No. 467,916

11 Claims. (Cl. 74—282)

This invention relates to drive mechanism and more particularly to drive mechanism for boats that can be driven from either one of two sources of power.

An object of the invention is to simplify drive mechanism for connecting either one of two sources of power with a propeller shaft.

Another object of the invention is to utilize a necessary engine accessory drive as a part of the drive mechanism between a source of power and a propeller shaft.

Another object of the invention is to provide drive mechanism for a propeller shaft and an engine accessory that can be operated by either one of two sources of power.

Another object of the invention is to provide drive mechanism for a propeller shaft that can be operated by an auxiliary source of power through a synchronized clutch unit without shock and distortion thereby permitting the use of a lighter and smaller unit.

Another object of the invention resides in control mechanism for drive mechanism in which a propeller shaft can be driven by either one of two sources of power.

Another object of the invention is to provide a pressure lubricating system, for drive mechanism actuated by either one of two sources of power, that will be effective when either source of power is in operation.

Other objects of the invention will appear from the following description taken in connection with the drawings, which form a part of this specification, in which.

Figure 1:
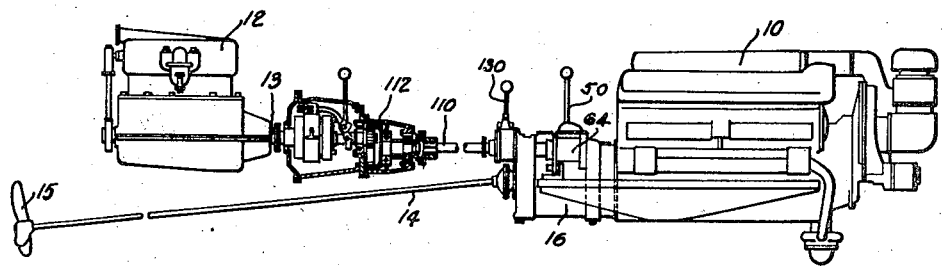
Fig. 1 is a side elevational view, partly broken away, showing two sources of power and drive mechanism for operating a boat propeller shaft.

The power device herein illustrated is especially adapted for boats but may have application for various other purposes. The main power plant is represented as a conventional internal combustion engine 10 having a crankshaft 11 and the auxiliary power plant is represented as a conventional internal combustion engine 12 having a crankshaft 13. These engines can be selectively controlled to drive a shaft 14 carrying propeller 15. Engine 10 is considerably larger and develops much greater power than the auxiliary engine which is generally utilized for maneuvering a boat around a harbor, or when conservation of fuel or minimum operation noise is desirable.

The crankshaft 11 of the main engine is connected with the propeller shaft 14 through conventional mechanism contained in the forward compartment of casing 16 whereby forward or reverse drive can be established, or a non-driving condition may be had. Drive shaft 17 extends through the central compartment of casing 16 and has sleeve 18 splined on one end thereof which is connected to propeller shaft 14. Bearing 19 carried by wall 152 of the casing supports the sleeve while the forward end of the drive shaft is carried by bearing 20 mounted in a flange 21 extending axially from disk 22. This disk is fixed to the crankshaft 11 by bolts 23 and has fixed thereto an internally splined annular driving ring member 24. A clutch member 25 is fixed on shaft 17 within the annular driving member and has teeth 26 adapted to be engaged by teeth 27 on a shiftable clutch member 28. The flange 29 of a sleeve 30 is splined to the ring driving member 24 and the shiftable clutch member 28 is slidably splined to this flange.

Between the clutch element 25 and the driving member 24 is arranged brake means. A hub 31 is splined to clutch member 25 and has angularly disposed peripheral cone surfaces on which brake lining material 32 is fixed. Ring members 33 encircle the hub and have interior cone surfaces complementary to the peripheral surfaces of the hub. These ring members are slidably splined to the surrounding driving member 24. A plurality of coil springs 34 engage adjacent surfaces of the ring members 33 and exert a force normally holding them disengaged from the brake lining on hub 31. The brake ring members are drivingly engaged with hub 31 by manually operable mechanism including a plurality of similar toggle mechanisms each including pivotally connected links 35 and 36, link 35 being pivotally connected with the rear brake ring member and link 36 being pivotally connected with a pin 37 extending through the brake ring members and an actuator ring 38. Actuator ring 38 is slidably splined to ring member 24 and between the actuator ring and the front brake ring member is arranged a plurality of coil springs 39 against which the actuator ring acts to engage the forward brake ring member with hub 31. Arms 40 are shifted to operate the toggle mechanisms, and such arms are anchored to pin 37 and to shift sleeve 41 carrying trunnions 42 engaged by a fork on lever 43 rockable on pivot 44 in the casing.

Figure 2:
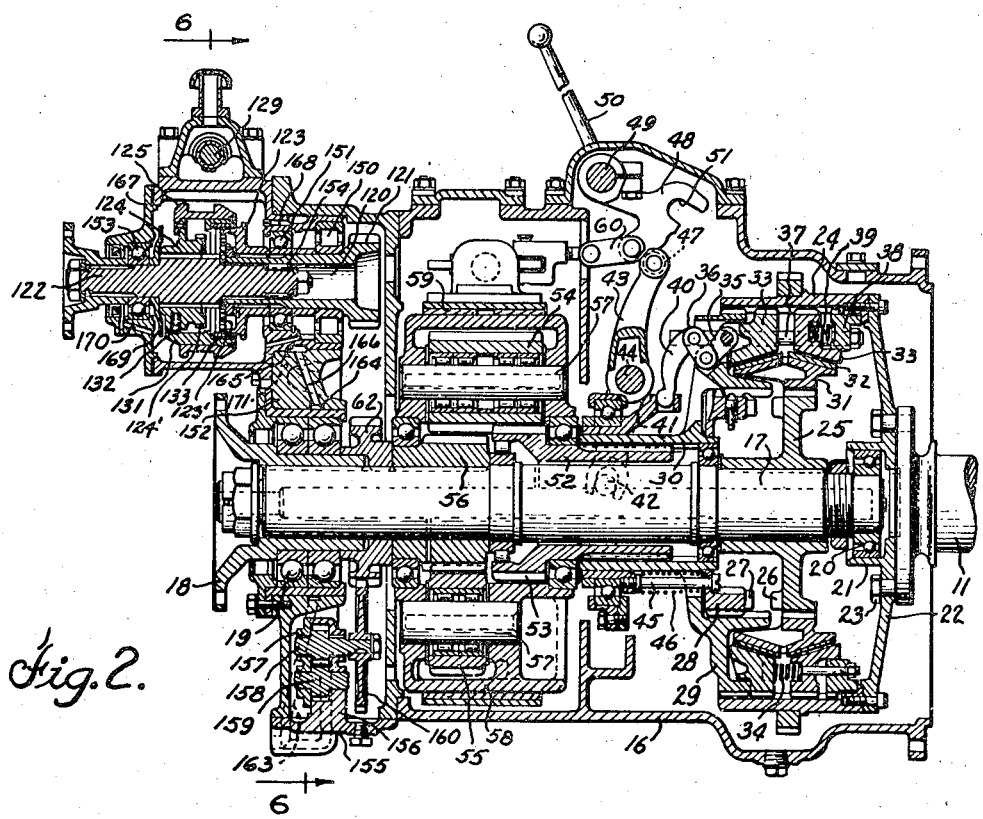
Fig. 2 is a sectional view of a portion of the drive mechanism showing the forward and reverse mechanism driven by the higher source of power, a portion of the drive mechanism from the lower power source and connections whereby either drive mechanism can operate the propeller shaft and a lubricating pump.

In the position shown in Fig. 2, the mechanism is adjusted for reverse drive. The shift sleeve 41 is in its rearmost position and the toggle mechanisms are collapsed so that springs 34 will disengage the brake ring members from hub 31. The shiftable clutch member 28 will be disengaged from clutch member 25, and the drive will be direct from crankshaft 11 to the drive ring member 24 and through the sleeve flange 29 to reverse gearing to be hereinafter described. When the lever 42 is rocked to move the sleeve 40 forwardly, the toggle mechanisms are shifted outwardly causing the rear brake member to first engage the hub 31 which will anchor the pivotal connection of links 35 therewith in an axial direction so that further outward shifting of the toggle mechanisms will shift pins 37 rearwardly through the connection of links 36 therewith carrying the actuator ring 38 therewith to press the forward brake ring member, through springs 39, into engagement with hub 31. This engagement of the brake ring members will cause the shafts 11 and 17 to rotate at substantially the same speed before the sleeve 41 has been shifted sufficiently to engage clutch teeth 27 with clutch teeth 26. As the sleeve 41 is moved forward, bolts 45 and surrounding springs 46 are moved forward until the springs engage the clutch member 28 and shift it into engagement with clutch member 25. These bolts are screwed into the sleeve and extend through openings in sleeve flange 29 and the clutch member 28.

Lever 43 has a roller 47 at its upper end bearing against a cam actuator 48 fixed on shaft 49 that can be oscillated by hand lever 50. When the cam actuator rocks the lever 43 to the position shown in Fig. 2, the brake ring members and clutch 28 will be disengaged for reverse drive. When the lever 50 is moved forwardly from this position the roller 47 will be engaged in recess 51 on the cam actuator to shift the brake ring members into engagement with the hub 31 and the clutch member 28 into positive engagement with clutch member 25 to give direct drive from driving member 29 and clutch 28 to hub 25 fixed to shaft 17.

The sleeve 30 is splined on another sleeve 52 having a gear 53 on the rear end thereof for driving reverse gearing. This gear 53 meshes with a plurality of wide gears 54 which in turn mesh with idler reverse gears (not shown) for driving a plurality of gears 55 meshing with gear 56 splined on shaft 17. Gears 54, the idler gears and gears 55 are rotatably mounted on shafts, such as indicated at 57, mounted on a carrier drum 58. This drum can be held stationary or released by suitable brake means 59 arranged to be operated by linkage 60 connected to the cam actuator. This arrangement is such that the brake means will be applied when the sleeve 41 is in the clutch releasing position shown in Fig. 2, whereby the drive will be transmitted through the reverse gearing from sleeve 30 to gear 56 fixed on shaft 17. When the cam actuator is moved to engage clutch elements 25 and 28, the brake means will be released and the reverse gearing will idle.

Gear 62 is splined to shaft 17, in the rear section of casing 16 between sleeve 18 and gear 56, and meshes with gear 63. These gears will be rotated from shaft 17 when shaft 11 is driven either forward or reverse. An accessory, such as generator 64, is mounted on the casing 16 and has a shaft 65 on which gear 66 is fixed and such gear meshes with gear 63. Gears 63 and 62 also serve as a part of the auxiliary drive mechanism between shaft 17 and the source of power 12.

Figure 3:
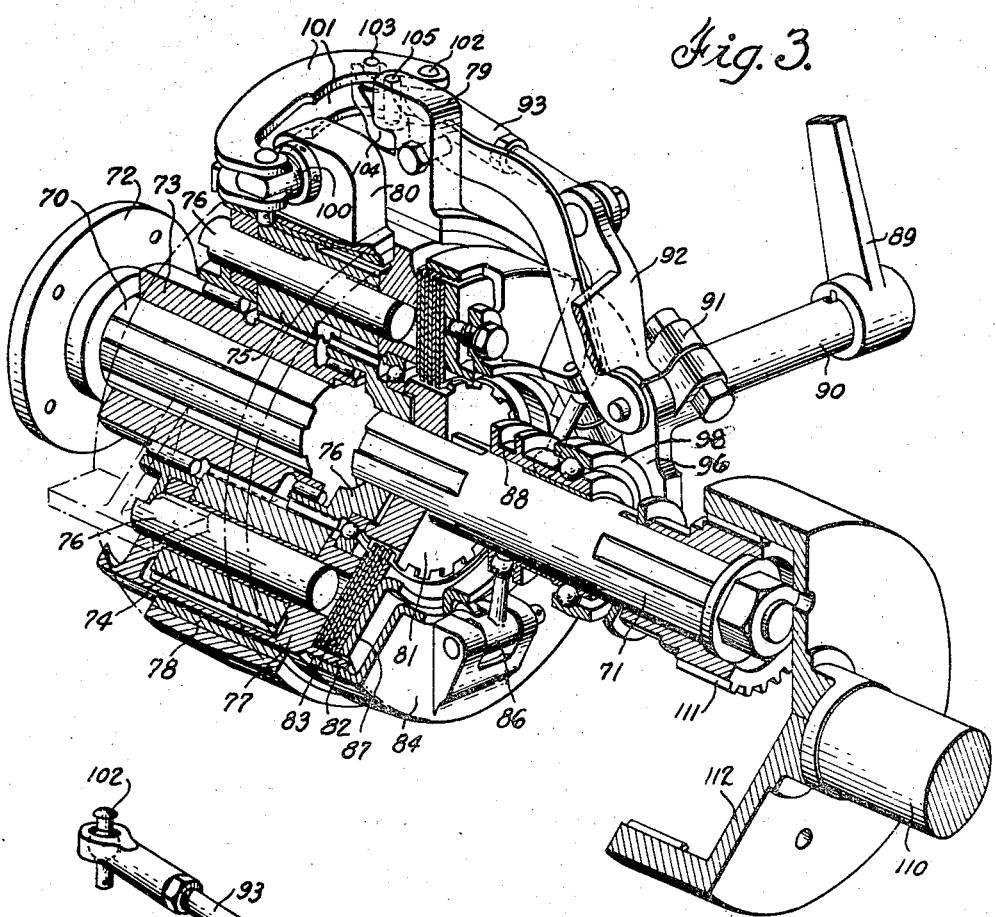
Fig. 3 is a perspective view of a portion of the drive from the lower power source showing the forward and reverse mechanism and the control therefor.
Figure 4:
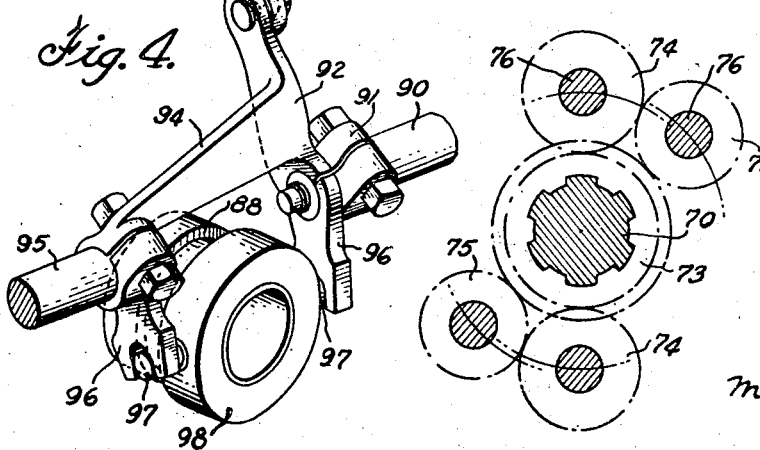
Fig. 4 is another perspective view of the control mechanism shown in Fig. 3 showing the brake and clutch shifting control.
Figure 5:
Fig. 5 is a diagrammatic view taken transversely through the mechanism shown in Fig. 3 to illustrate the gearing relation.

In this auxiliary drive there is a selective forward or reverse drive mechanism arranged between drive shaft 70 and driven shaft 71, see Fig. 3, shaft 70 being connected with crankshaft 13 by a suitable coupling member 72. Sleeve sun gear 73 is splined on the drive shaft and relatively long gears 74 mesh therewith. Gears 75 mesh with gears 74 and with sleeve gear 76 splined on the driven shaft. Gears 74 and 75 are mounted on pins 76 mounted on carrier 77 around which is arranged brake band 78. The ends of the band have ears 79 and 80 fixed thereto operable to engage or release the band. When the ears are moved toward each other, the band will be applied to the carrier so that the drive from shaft 70 to shaft 71 will be reversed through gear train 73, 74, 75 and 76.

Splined to shaft 71 adjacent gear sleeve 76 is a hub 81 and between such hub and the flanged end 82 of the carrier is arranged clutch disks 83 alternately in driving relation with such elements. A supporting ring 84 is screwed on the flanged end of the carrier and has bell cranks 86 pivotally mounted thereon. One arm of the bell cranks engages the clutch pressure plate 87 and the other arms of the bell cranks are anchored to sleeve 88 mounted for axial movement on shaft 71. Engagement of the clutch disks will lock hub 81 with carrier 77 and as gear 76 and hub 81 are splined to shaft 71, the reverse gearing and casing will be locked so that the drive is direct from shaft 70 through the locked gearing and clutch to shaft 71.

The clutch and brake for the auxiliary drive is controlled by the position of hand lever 89 fixed on rock shaft 90. An actuator 91 is fixed on this shaft and has an arm 92 to which link 93 is pivotally connected. Another arm 94 extends from arm 92 and is fixed on shaft 95. The actuator 91 and arm 94 have forks 96 engaging trunnions 97 on collar 98 rotatably mounted on the sleeve 88. When the lever 89 is moved to the left, as shown in Fig. 3, the forks will shift the collar 98 and sleeve 88 axially to rock the bell cranks so that they react on the clutch pressure plate to engage the disk clutch and thereby establish forward direct drive. When such drive is established the brake will be released.

The brake is applied and released by mechanism connected with ears 79 and 80 and link rod 93. An anchor member 100 is fixed to ear 80 and a pair of curved link members 101 are pivotally connected at one end to the anchor member. Link 79 is connected to the other end of these members 101 by pivot pin 102. Pin 103 extends across the space between members 101, adjacent pin 102, and the forked end of a link 104 engages such pin. Link 104 is pivotally connected with brake band ear 79 by pin 105. Movement of lever 89 to the right, as viewed in Fig. 3, rocks arm 92 in the same direction carrying link 93 therewith. This movement of link 93 shifts members 101 therewith causing ear 80 and ear 79 to be moved toward each other applying band 78 to the carrier 77. Movement of shaft 90 to apply the brake band also moves the disk clutch actuating mechanism into clutch releasing position. When lever 89 is centrally of its range of adjustment, both the clutch and the reverse gear will be out of driving position, or in neutral.

Shaft 71 drives shaft 110 and between such shafts is arranged meshing reduction gears 111 and 112. Between shaft 110 and the generator driving gear 63 is arranged clutch mechanism whereby drive from the auxiliary drive mechanism to the propeller shaft can be established or disconnected. This clutch includes synchronizer mechanism for the purpose of bringing shaft 110 to a speed near enough to the speed of sleeve shaft 120 before connecting the auxiliary drive with the propeller shaft.

Figure 6:
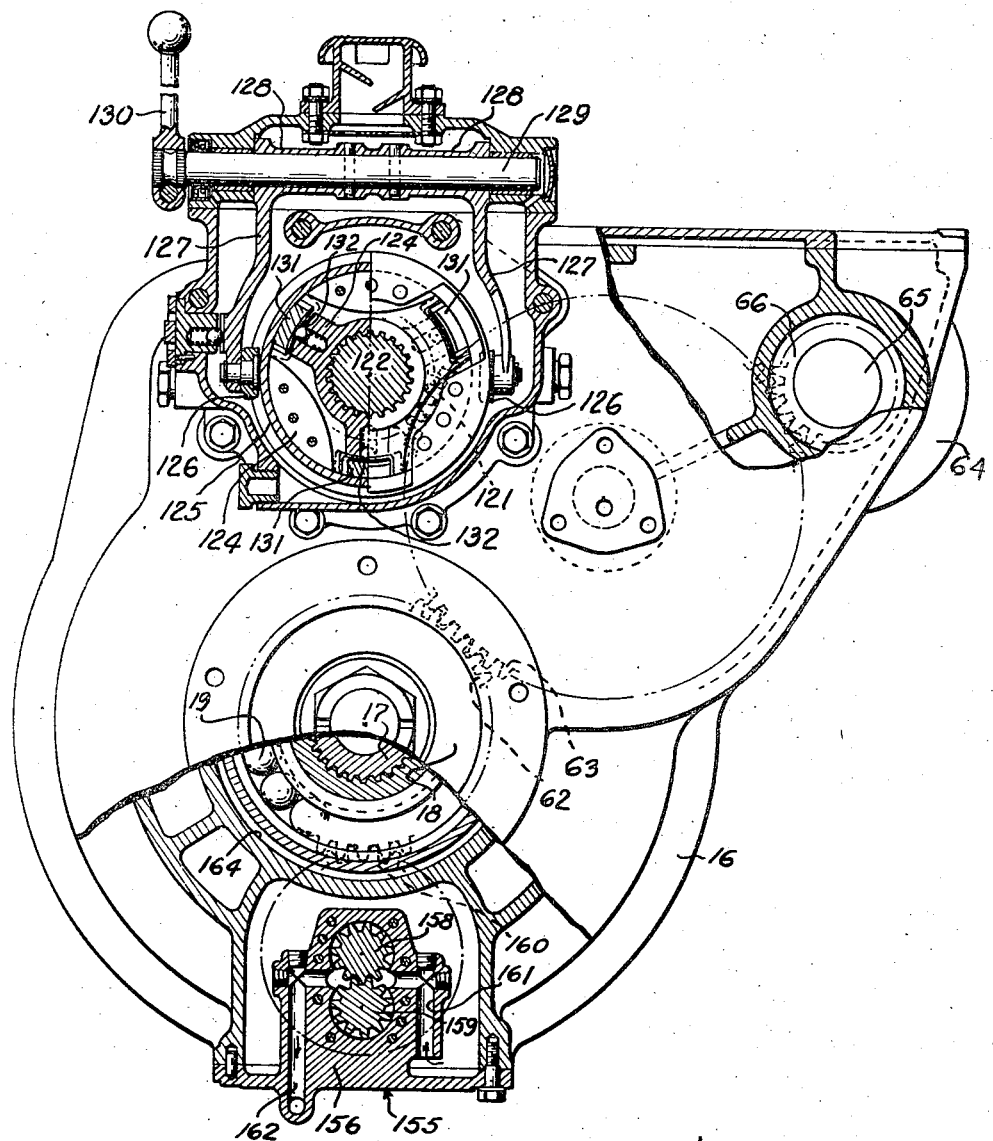
Fig. 6 is a sectional view taken on line 6—6 of Fig. 2.

Sleeve shaft 120 carries gear 121 that meshes with the generator driving gear 63 and shaft 122 is fixed to rotate with shaft 110. Clutch ring 123, having internal teeth and an external cone brake surface, is splined on shaft 120 in the rear compartment of casing 16 and clutch ring 124 is slidably splined on shaft 122 and is formed with external teeth 124' for engagement with the internal teeth 123' of clutch ring 123. Clutch ring 124 has a grooved collar portion 125 in which rollers 126 engage, see Fig. 6, such rollers being fixed to arms 127 on sleeves 128 that are fixed on shaft 129. Lever 130 is fixed to an end of shaft 129 extending externally of casing 16. A synchronizer brake ring 133 is arranged internally of the collar 125 of clutch ring 124 and has an internal cone brake surface for engaging the similar surface on clutch ring 123. This brake ring has fingers 131 extending through slots in the clutch ring 124. Spring pressed balls 132 carried by clutch ring 124 engage these fingers in a relation creating force sufficient to normally hold rings 124 and 133 together when shifted axially, so that the brake surfaces will engage and synchronize shafts 122 and 120 before the teeth on the clutch rings are engaged.

When getting underway on the auxiliary engine, the auxiliary gearing and the main gearing should be in neutral and the synchronizer clutch should be disengaged. The auxiliary engine is then started, the synchronized clutch is next engaged and last the auxiliary gearing is shifted into either forward or reverse drive.

When transfer of the drive from the auxiliary mechanism to the main mechanism is desired, the main mechanism is in neutral and the main engine is started. The auxiliary mechanism is next put in neutral and the auxiliary engine throttle is closed. The synchronized clutch is next disengaged and the main drive mechanism is shifted into forward or reverse drive.

When transfer to the drive from the main mechanism to the auxiliary mechanism is desired, the speed of the main engine is reduced and the main drive mechanism is put in neutral. The auxiliary drive mechanism must also be in neutral and the synchronized clutch disengaged. The auxiliary engine is then started, the synchronized clutch is then engaged after which the auxiliary drive mechanism is shifted into forward or reverse. If the boat is in motion, the auxiliary engine throttle is operated to speed up the auxiliary drive when being placed in driving relation because of the reduction in the drive through the generator drive gearing forming a part of the auxiliary drive. Thus at the time of connecting the auxiliary drive mechanism in driving relation, the rotational driving force of the propeller through the auxiliary drive mechanism will have a minimum shock effect.

The rear portion of the casing 16 houses a portion of shaft 17, a portion of sleeve 18, drive gears 62, 63 and 66, shaft 120, a portion of shaft 122 and the synchronizer clutch. In addition to housing such elements, the rear portion of casing 16 serves to enclose and provide a part of a lubricating system for the clutch 123, 124, 125 and the bearings adjacent thereto and gears 62, 63 and 66. Sleeve shaft 120 is carried by roller bearing 150 and ball bearing 151, such bearings being mounted in rear wall 152 of the casing 16. Shaft 122 is supported at one end by ball bearing 153 and by roller bearing 154 mounted interiorly of sleeve shaft 120.

An accessory, such as a pump unit 155, is detachably secured to the bottom of the central compartment of casing 16 and the housing for the pump comprises a main portion 156 and a cover portion 157. Gears 158, 159 are mounted in the pump housing and the shaft portion of gear 157 projects through the housing and has drive gear 160. This drive gear is arranged to mesh with gear 62 when the pump unit is assembled with the casing. The pump housing is formed with an oil inlet passage 161 leading from adjacent the bottom of casing 16 to the pump gears. An oil outlet passage 162 is formed in the pump housing and leads from the pump gears to a passage 163 in wall 152 which terminates in a circular groove 164 around bearing 19. Another circular groove 165 is formed around the clutch housing 167 and is connected with groove 164 by passage 166 in wall 152. Oil flows from groove 165 to the interior of the clutch compartment of the casing through an opening 168, having a restricted outlet end, to lubricate the clutch elements. A disk 169 rotates with shaft 122 in the clutch compartment of the casing to throw oil into bearing 153 and such oil can drain back into the clutch compartment of the casing through passage 170 in the casing wall. Oil from the clutch casing will work through bearings 151 and 150 and will drain onto gears 121, 63, 62 and 160. There is a drain passage 171 in wall 152 through which oil passes from the clutch casing compartment back into the central compartment of casing 16. Such draining oil will accumulate adjacent the pump and be drawn into the pump housing for recirculation through the lubricating circuits.

It will be seen that the two accessory devices will be driven with the drive shaft 17 whenever it is rotated by either of the power-operated mechanisms. The general driving structure is simplified because the accessory drive is utilized as a driving connection between the auxiliary drive mechanism and the drive shaft 17 when the main drive mechanism is rendered ineffective. By means of the various controls for the power driving mechanisms, either mechanism can be selected to operate the propeller shaft and the accessories in either forward or reverse drive. Turning the accessories in reverse will, of course, render them ineffective but this has no ill effect because boats are driven in reverse very seldom and for a very limited time.

Although the invention has ben described in connection with a specific embodiment, the principles involved are susceptible of numerous other applications which will readily occur to persons skilled in the art. The invention is therefore to be limited only as indicated by the scope of the appended claims.

What is claimed is:

1. In a boat driving mechanism, the combination with a propeller shaft, of a main engine, direct connecting, reversing and disconnecting mechanism between said engine and the propeller shaft, an auxiliary engine, direct connecting, reversing and disconnecting mechanism for said auxiliary engine, a reduction gear mechanism driven by said latter mechanism, a drive shaft driven by said gear mechanism, a second reduction gear mechanism geared to drive said propeller shaft, connecting and disconnecting mechanism between said drive shaft and said second reduction gear mechanism, and an accessory drive gearing formed as a part of said second reduction gear mechanism.

2. In a boat driving mechanism, the combination with a propeller shaft, of a main engine, direct connecting, reversing and disconnecting mechanism between said engine and the propeller shaft, an auxiliary engine, direct connecting, reversing and disconnecting mechanism for said auxiliary engine, a reduction gear mechanism driven by said latter mechanism, a drive shaft driven by said gear mechanism, a second reduction gear mechanism geared to drive said propeller shaft, and connecting and disconnecting mechanism between said drive shaft and said second reduction gear mechanism.

3. In a boat driving mechanism, the combination with a propeller shaft, of a main engine, direct connecting, reversing and disconnecting mechanism between said engine and the propeller shaft, an auxiliary engine, direct connecting, reversing and disconnecting mechanism for said auxiliary engine, a reduction gear mechanism driven by said latter mechanism, and connecting and disconnecting mechanism between said reduction gear mechanism and the propeller shaft.

4. In a boat driving mechanism, the combination with a propeller shaft, of a main engine, direct connecting, reversing and disconnecting mechanism between said engine and the propeller shaft, an auxiliary engine, direct connecting, reversing and disconnecting mechanism for said auxiliary engine, a reduction gear mechanism driven by said latter mechanism, a drive shaft driven by said gear mechanism, a second reduction gear mechanism geared to drive said propeller shaft, and connecting and disconnecting mechanism including a synchronizing clutch unit between said drive shaft and said second reduction gear mechanism.

5. In a boat propelling mechanism, the combination with a propeller shaft, of a main engine, means to connect said engine to and disconnect it from the propeller shaft, an auxiliary engine, a reduction gearing between said auxiliary engine and said propeller shaft including an intermediate gear, said intermediate gear being independent of the means connecting the main engine to the propeller shaft, an engine accessory, and means for driving said accessory from said intermediate gear.

6. In a boat propelling mechanism, the combination with a propeller shaft, of a main engine, a connecting shaft between the main engine and the propeller shaft, a gear on said connecting shaft, an auxiliary engine, a gear driven by said auxiliary engine, an idler gear between the last mentioned gear and the gear on the connecting shaft, an accessory driven by said idler gear and an accessory driven by the gear on said connecting shaft.

7. In a boat propelling mechanism, the combination with a propeller shaft, of a main high output engine, means to connect said engine to and disconnect it from the propeller shaft, a smaller high speed engine, and means connecting said smaller engine with said propeller shaft, said latter means comprising an intermediate shaft, connecting and disconnecting means and a reduction gearing between said auxiliary engine and said intermediate shaft, and connecting and disconnecting means and a reduction gearing between said auxiliary shaft and said propeller shaft.

8. In a boat propelling means, the combination with a propeller shaft, of an engine, direct connecting, reverse and disconnecting mechanism for said engine, reduction gearing driven by said mechanism, a drive shaft driven by said reduction gearing, a second reduction gearing between said drive shaft and said propeller shaft, and means for connecting said drive shaft to and disconnecting it from said second reduction gearing.

9. In a boat propelling mechanism, the combination with a propeller shaft, of a main engine, means for direct one-to-one connection of said engine to and disconnection from the propeller shaft, a relatively lower powered auxiliary engine, and connecting and disconnecting means and a reduction gearing between said auxiliary engine and the propeller shaft, and accessory drive mechanism so connected as to be driven when either the main engine or the auxiliary engine is connected for driving the propeller shaft.

10. In a boat propelling mechanism, the combination with a propeller shaft, of a main engine, means for direct one-to-one connection of said engine to said propeller shaft, an auxiliary engine of relatively lower power than the main engine, a reduction gearing between said auxiliary engine and said propeller shaft, an engine accessory, means for driving said accessory from either the main engine or the auxiliary engine which means includes part of said reduction gearing, said latter means driving said accessory faster relative to the main engine than to the auxiliary engine.

11. In a boat propelling mechanism, the combination with a propeller shaft, of a main engine, means connecting said engine to the propeller shaft, an auxiliary engine, an engine accessory, a gear intermediate said auxiliary engine and said propeller shaft for driving said accessory, a pinion driven by said auxiliary engine and meshing with said intermediate gear, and an appreciably larger pinion on said propeller shaft meshing with said intermediate gear.

MARSDEN WARE.